Patented Mar. 21, 1944

2,344,671

UNITED STATES PATENT OFFICE 2,344,671

HIGHER MOLECULAR ALCOHOLS

Heinrich Bertsch, Rabenstein, near Chemnitz, Germany, assignor to American Hyalsol Corporation, Wilmington, Del., a corporation of Delaware No Drawing. Application September 3, 1938, Serial No. 228,459. In Germany August 18, 1928

6 Claims. (Cl. 106—3)

This invention relates to the processing and finishing of natural and synthetic fibers, whether of vegetable or animal origin, and to the improvement of the softening, spreading, or lubricating properties of various surface treating and other compositions and materials hereinafter described more in detail.

For some of the purposes for which the substances of the present invention are employed, it has heretofore been proposed to use various waxes and greases, but these substances in general have one or more of the objections that upon aging they become rancid, possess an objectionable odor, discolor the material or have a sticky feel, or do not accomplish their intended result with a sufficient degree of success.

The principal object of this invention is to provide industry, more particularly the textile, leather and allied branches of industry, with an exceedingly effective class of novel softening agents, lubricating, dispersing and smoothing media, which do not possess any of the above mentioned objections.

Another object is to provide the rubber, soap, plastic, cosmetic, printing, writing, pharmaceutical, paper, surface treatment and other industries with neutral agents of high stability which have excellent dispersive powers. These agents in many industries impart added flexibility, increased smoothness, greater pliability, improved absorptive or adsorptive power as well as acting as a dispersing agent. In fact, these agents have proved valuable wherever penetration is necessary, thereby increasing the homogeneity or making wholly homogeneous mixtures which have heretofore been heterogeneous. They have proven especially valuable in bringing interpenetration among non-analogous surfaces. This dispersing action to a large extent is due to the dual or combined effect of the polar hydroxyl group with a long aliphatic group. The hydroxyl group attracts the alcohols to polar substances, such as metallic surfaces, and renders the alcohols readily dispersible in water. The long aliphatic group renders the alcohols soluble in oils, fats, and waxes. The combination of the two groups causes the alcohols to improve the tendencies of oils, fats, and waxes containing the alcohols to adhere to polar surfaces, such as metals, and to improve the dispersibility of such materials in water. The alcoholic group also appears to improve the dispersibility in water of pigments which have been coated with the alcohols.

It has been found that the higher aliphatic alcohols, or alcohols corresponding to higher fatty or oily acids, such for example as stearyl and oleyl alcohols have in a high degree the property of rendering textile fibers, in particular, soft and pliable. For this purpose the fibers are treated either with solutions of the alcohols in any desired organic solvent, for instance benzine, turpentine, carbon tetrachloride, trichloroethylene, pyridine or the like, or with aqueous emulsions of said alcohols. For producing such emulsions use may be made of known dispersion agents such as aromatic sulpho-acids, sulphonated oils, such as Turkey red oils, stearyl sulfate salts, and the like. The treated fibers exhibit, after the removal of the solvent or dispersion agent, exceptional smoothness and pliability and are, moreover, free from odor and insensitive to the effects of water. Such properties are particularly desirable in the greasing of crude fibers, in the sizing of yarns before weaving and finally in the dressing of the finished fabric. The attainment of a good soft effect is similarly important for wool, cotton, silk and artificial silk, and is particularly important for the last named. The alcohols corresponding to the higher fatty acids give particularly good results in the reviving and sizing of artificial silk. They are very effective in increasing the smoothness and flexibility of yarns before weaving or fabrics after weaving, in imparting a good gloss but soft texture to calendered fabrics, in giving to cotton a silky feel, in increasing the flexibility of leather, and in imparting a gloss and softness to furs.

By a proper treatment with these alcohols the properties of silk, artificial silk, cotton, mercerized cotton, woolens, linen goods, leather, furs and other fibers, whether dyed or not, are improved in one or more ways.

In the treating of artificial silk or rayon the fabric which is to be impregnated may have the alcohol adsorbed on the fibers or it may be absorbed within the very structure of the fibers by placing the alcohol in the spinning bath before the fibers are formed in the spinning operation. In each instance an increased softness and smoothness is imparted to the product. Furthermore, in the weaving operation, the cloth is lubricated without injury to the machines used. At the same time, the cloth does not become electrically charged as has frequently been the case in the past with some artificial fibers.

The use of the alcohols in the spinning bath makes possible better dyeing. The dyes may be placed in the spinning bath or the rayon may be dyed afterward. In either instance a product superior to those heretofore possible will result. Scrooping, sizing, delustering, or other agents may also be incorporated in the spinning bath along with the alcohol. The alcohols have proven valuable for many such purposes themselves. Textiles, in general, treated with the higher molecular alcohols have an improved handle. In the treatment of artificial cellulosic product in the spinning baths, most of the benefits of after treatment are procured with much less labor and with a considerably smaller outlay of raw materials.

In the treatment of animal fibers such as fibers of hair as well as the skins, an added softness and pliability is imparted to the treated product. When furs are treated the hides are softened, the hairs are lubricated and have a pleasing gloss added to them. The alcohols may also be made a media for the vermin proofing of the furs or they may contribute materially themselves to such a result. Animal fibers, such as wool, are lubricated and made especially soft and pliable while having an excellent size. On the addition of the alcohol, the yarn may be much more effectively dyed; especially if synthetic cellulosic compounds are incorporated as a part of the yarn itself.

The fatty alcohols, due to their neutral character and high stability, find wide use in both alkali and acid textile treating baths. When used in caustic baths, such as mercerizing baths, they give a silk-like feel and appearance to fabrics treated.

Cotton may be made more pliable and softer if treated with the alcohols. The alcohols may also be used to soften and lubricate silk for weaving operations.

When leather is treated with the higher molecular aliphatic alcohols, they impart greater flexibility, a higher gloss and a softer, smoother feel to the resulting product. In tanning operations the absorptive and dispersive capacity of the alcohols makes possible a more completely tanned product, which is consistent in texture and pliability.

Apart from the textile and leather industries, the alcohols of the higher fatty acids may be employed as constituents of other preparations for impregnating purposes of all kinds where it is important to obtain softness and smoothness in the objects treated, thus, as additions to shoe-creams and polishing waxes.

As they are completely neutral and highly stable substances the alcohols are also valuable as constituents of pigment color creams, polishing rouges and other preparations for the working or superficial treatment of metals, in which latter case the alcohol, for example, oleyl alcohol may be mixed with lubricating oil or grease in proportions depending upon the particular treatment for which the preparation is intended. Such alcohols and compositions are suitable for metal drawings, punchings, stampings and many other operations where lubricants and polishing agents are needed.

In the rubber industry the higher molecular alcohols have proven to be of unexpected merit. As a dispersing media they have proven invaluable in procuring homogeneous dispersions in mixtures involving latex, regenerated rubber and caoutchouc. In the dispersion of powdered and granular materials, such as dyestuffs and pigments, the absorptive capacity of the alcohols has made them available as plasticizers which protect the operators from the deleterious effects of the volatile ingredients, which they have heretofore been forced to breathe. In the preparation of rubber compositions the higher alcohols, perhaps due to their capillary activity, have made it possible to eliminate the formation of air bubbles in the mass before vulcanization, thereby producing an uniform and improved product. Anti-agers and accelerators are also better dispersed when the alcohols are used in the production of rubber. The rubber products produced by processes using said alcohols have proven to be more elastic, ductile, durable, and stronger. The process of vulcanization has also been hastened and improved. After the product is produced, the rubber may be softened and the surface preserved if the finished product is surface treated with said alcohols.

In the surface treatment of wood, metal and other surfaces the higher aliphatic alcohols have proven of inestimable value. In the metal industry they form valuable, stable ingredients as dispersive medias in boring oils, pickling baths and metallurgical etching operations. Likewise they form valuable addition products to waxes, creams, polishes and emulsions. Their stability, pliability and dispersive characteristics find further utility as components of paints, varnishes, lacquers and the like. As dispersive media for color and color pigments they prove to be of high utility. Various surface treating and coating preparations are made more pliable and the surfaces such as floors, furniture, enamels and the like treated therewith have a uniform appearance. The gloss and surface friction may be materially affected by selecting alcohols of varying molecular composition. The higher alcohols have proven especially valuable as addition to polishes and creams used on furniture and shoes.

The higher fatty alcohols are extensively used as plasticizers. In the formation of foils and capsules whether made from casein, gelatin, glue or other albuminous or protein compounds, the higher aliphatic alcohols not only act as plasticizers, but they also act as suppling agents giving to the surface of such capsules and foils the pliability so necessary in their various uses. In the formation of various plastic masses used in molding, modelling, the ceramic industry and the like, the alcohols not only act as plasticizers but, due to their dispersive and impregnating ability, become vehicles for the dispersion of colors, pigments, or other ingredients.

In the soap and cosmetic industry the alcohols serve as plasticizing, superfatting, dispersing, and odor fixing media. Alcohols of certain molecular content, such as myristyl and cetyl alcohol, have the quality of melting at or approximately at body temperature thereby having unusual utility in these fields. Mixtures of liquid and solid alcohols of the nature herein described may be used. It is frequently desirable to impart to detergents and cosmetics pleasing odors which are expensive and usually very unstable. The higher alcohols in addition to serving other useful purposes have proven to have the unexpected quality of resorbing and fixing such odors to a degree heretofore impossible.

Papers impregnated with higher molecular alcohols are highly resistant to water, present a smooth surface and have an excellent size.

In the preparation of carbon paper, stencils, typewriter ribbon and other media for the writing, printing and duplicating arts the higher fatty alcohols free of objectionable odor imparting compounds may be used as dispersing agents for dyes, inks, carbon black and the like. The products so produced are soft and pliable, have uniform dispersions, demonstrate exceptional stability, and produce clear and uniform copy.

In the pharmaceutical, drug, therapeutic and similar products, the higher molecular aliphatic alcohols find utility in the production of germicides, insecticides, vermicides, disinfectants, salves, creams, and various emulsions and colloids. The previously mentioned characteristic of melting at body temperature proves valuable when they are used as additions to salves. The powers to disperse uniformly and to maintain stability in the presence of other chemicals prove valuable when the alcohols are used for many of the above purposes and also when they are used in the making of adhesives from starches and other sources.

The higher fatty or oily alcohols due to their exceptional stability, dispersive ability and neutral character have proven valuable in many other practical ways. In the production of artificial waxes or resins or mixtures of artificial and natural products their presence has resulted in uniform products. Brake fluid efficiency may be materially increased in the presence of properly selected alcohols. Whenever emulsions are necessary, such for instance, as oil emulsions for road surface treatment, the use of the alcohols results in a highly homogeneous mixture. Colors, regardless of their nature, may be dispersed in a variegated manner as in the production of linoleum. Materials for the production of artificial leather have their workability improved and the product itself is enchanced if said alcohols are used in the production processes.

The higher molecular aliphatic alcohols within the broader scope of the present invention comprise those having more than 8 carbon atoms and in particular those having from 9 to 22 carbon atoms. Where the finishing of fibers is concerned, those alcohols having from 16 to 22 carbon atoms in the molecule give the best results. For other purposes those alcohols having from 9 to 14, inclusive, carbon atoms in the molecule are more satisfactory.

The alcohols finding most frequent use in the processes herein disclosed are decyl, lauryl, myristyl, cetyl, stearyl, oleyl, ricinoleyl and commercial mixtures of stearyl with cetyl and decyl with lauryl alcohols. Thus it will be observed that unsaturated as well as saturated higher aliphatic alcohols may be employed.

Example 1

Stearyl alcohol is molded into small blocks and is positioned such that artificial silk thread is contacted therewith while being wound upon the spools with the aid of a suitable thread-guide in the usual manner. The thread is thereby superficially coated with the stearyl alcohol and rendered smooth and flexible. The properties of artificial silk are substantially improved especially for weaving operations.

It is surprising that silk thread coated in this manner with stearyl alcohol alone, or instead with mixtures of such alcohol with paraffin or wax, can later be freed of its coating by washing much easier than when paraffin or wax alone has been used.

Example 2

Dyed artificial silk in hanks is treated for a short time with a solution containing 10 g. of stearyl alcohol per litre of benzine. Then the material is wrung and dried for a short time in order to remove the solvent. The artificial silk treated in this way has an excellent smooth and soft feel and its color has not been faded.

Example 3

.2 kg. of technical cetyl alcohol, iodine number 20, are dissolved in 40 litres of carbon tetrachloride. Mixed fabrics, for example such as are used for linings, made out of artificial silk and mercerized cotton, are treated with this solution for a short time on a suitable impregnating machine. After the superfluous solvent has been removed by suction and warm calendering, goods are obtained having an excellent finish. They show a good gloss, great softness and do not later become rough on account of the high smoothness imparted to them.

Example 4

One part of oleyl alcohol, iodine number 82, is added to 2 parts of concentrated Turkey red oil containing about 70% total fat content, thereby forming a white mass. A water solution containing 9 g. of the mass per litre is then prepared. Woolen tricot goods are treated with this emulsion for a short time after which they are centrifuged, dried and calendered. The goods prepared in this way are very smooth and possess a full and soft feel.

Example 5

One kg. of technical stearyl ammonium sulfate is dissolved in 23 litres of boiling water. 9 kg. of a commercial mixture of cetyl and stearyl alcohols are mixed with the hot solution by stirring. The homogeneous paste obtained by this process constitutes an excellent finishing agent for artificial silk and textiles of all kinds.

A solution is prepared with hot water, containing 2 g. of paste per litre. Raw artificial silk in hanks is treated with this solution at 50–60° C. by a sprinkling device. The artificial silk thread after finishing in the usual manner is very smooth and flexible which makes it suitable particularly for further treatment. The threads also are soft and free of stickiness. The artificial silk does not turn yellow nor does the finishing agent become rancid, even after long storage.

Example 6

One kg. of the paste prepared according to Example 5 from stearyl ammonium sulfate as an emulsifier and commercial cetyl or stearyl alcohol mixture, is dissolved by boiling with about 20 litres of water and later adding 180 additional litres. With this emulsion linen goods are treated on the foulard at about 40° C. The dried and mangled goods have a fine smoothness and flexibility. Also creasing is favorably influenced by this treatment. The imparted finish is unchanged by storage.

A solution of substantially the same quality can be obtained by partially sulfonating or sulfating a commercial mixture of cetyl and stearyl alcohols and neutralizing to form water soluble salts. In this case, the sulfated salts of the alcohols serve as the emulsifier of the unchanged alcohols.

Example 7

Seven kg. of technical lauryl alcohol are mixed with 3 kg. of a liquid emulsifier consisting of 1.8 kg. of gum arabic, 0.15 kg. of technical lauryl sodium sulfate, 0.3 kg. of the triethanolamine salt of stearic acid and 0.75 kg. of water. The paste thus obtained is diluted with water to a concentration of 5 g. of paste per litre. Bleached wound wadding, consisting of loose cotton, is treated with the obtained emulsion in the cold or without heating. The goods are then centrifuged and dried at a temperature below 40° C. The finished material possesses an extremely strong, crackling silky feel which otherwise can only be obtained by a twofold treatment with Marseilles' soap and a subsequent treatment with sulphuric acid.

Example 8

The concentrated paste prepared according to Example 7 from commercial lauryl alcohol and an emulsifier is diluted with 3 parts of water. The emulsion thus obtained is added by means of plush or brush to the flesh-side or to grain side or to both sides of a vegetable tanned leather. The leather thus obtained after drying possesses a very good crackling effect, as is desired for morocco leather and portfolio leather.

In this way it is even possible to produce an excellent crackling effect on vegetable tanned East India sheepskins.

Example 9

20 kg. of commercial cetyl alcohol are melted with 80 kg. of carnauba wax. The composition obtained is used for the hot greasing of technical leather. The greasing temperature can be kept relatively low and as a result the finished leather receives an increased flexibility of the grain.

Example 10

Four hundred g. of a commercial mixture of lower fatty alcohols, chiefly consisting of decyl and lauryl alcohols are dissolved in 1600 g. of trichlorethylene and then intimately mixed with about 50 kg. of moistened shavings. The shavings are employed in the usual manner for treating furs whereby the latter are slightly greased and receive an excellent gloss.

The alcohol treatment of textiles in accordance with the present invention should not be confused with wax treatments heretofore employed some of which waxes contain a small percentage of alcohol. The ester components of the wax impart objectionable properties which the alcohols alone do not. Furthermore, those extremely high molecular alcohols contained in certain waxes are in general not as satisfactory as the lower alcohols, that is, those having from 9 to 22 carbon atoms.

The present invention is independent of the method by which the alcohols are obtained. Satisfactory methods include the sodium and alcohol method of reduction of lower alkyl esters of higher fatty acids, the catalytic hydrogenation of higher fatty acid compounds with copper, for example, as a catalyst, the saponification and distillation of certain liquid waxes or the oxidation of hydrocarbons of suitable molecular weight. For most purposes the normal primary alcohols as produced by the first three methods described are preferred. Secondary alcohols as produced by the fourth method, if properly purified are suitable for some of the uses described herein.

This application is a continuation in part of applicant's copending applications, Serial No. 382,076, filed July 29, 1929, and Serial No. 52,701, filed December 3, 1935 now issued as Patent No. No. 2,132,348 of October 4, 1938.

The term "metal working" as employed herein refers to processes wherein labor is expended upon metal to alter the surface thereof and is not to be confused with simple lubrication wherein the intent is to avoid alteration of the metal surface.

It should be understood that the invention is not limited to the specific details and examples herein given but that it includes all equivalent materials coming within the scope of the broad descriptive terms employed in the disclosure and in the appended claims.

Example 11

12 parts by weight of oleyl alcohol, 3 parts by weight of paraffin are melted and 50 parts by weight of powdered chalk and 20 parts by weight of kieselguhr, which were warmed beforehand, are added while stirring. The mass is then suitably moulded to form tablets or the like.

Example 12

| | Parts by weight |
|---|---|
| Soap | 6 |
| Lauryl alcohol | 6 |
| Water | 11 |
| Polishing slate | 20 |
| Powdered chalk | 30 |
| Polishing rouge | 10 |
| Magnesium oxide | 6 | are mixed to form a polishing soap for metals.

Example 13

5 parts by weight of ceresin, 4 parts of stearyl alcohol, 40 parts of oleyl alcohol are melted and 51 parts of kieselguhr are added while stirring. The mixture is then filled into cans.

I claim:

1. Preparations for the working of metals containing a base material consisting essentially only of water insoluble fatty alcohols of 18 carbon atoms.

2. Preparations for the surface treatment of metals containing normal primary monohydric higher aliphatic alcohols having 18 carbon atoms in the molecules.

3. The process of improving the properties of polishing creams, metal working preparations, and dispersions, each of which contains a pigment which comprises, incorporating therein as the base material for dispersing the pigment an aliphatic alcohol having 18 carbon atoms in the molecule.

4. Pigment dispersion and polishing creams and metal working preparations having as their base material, stearyl alcohol.

5. Preparations for pigment dispersion, polishing, and surface treatment having a base composed of oleyl alcohol.

6. Preparations for pigment dispersion, polishing and surface treatment having a cream base composed of a higher molecular aliphatic alcohol having 18 carbon atoms.

HEINRICH BERTSCH.